United States Patent [19]
Matsuo et al.

[11] Patent Number: 5,991,053
[45] Date of Patent: Nov. 23, 1999

[54] FACSIMILE MACHINE

[75] Inventors: Kohichi Matsuo; Toshihiro Mori; Tetsuya Sugimoto, all of Osaka; Koichi Shibata, Sakai; Masakazu Oyama, Yamatokoriyama, all of Japan

[73] Assignee: Mita Industrial Co., Ltd., Osaka-fu, Japan

[21] Appl. No.: 09/055,681

[22] Filed: Apr. 6, 1998

[30] Foreign Application Priority Data

Apr. 15, 1997 [JP] Japan ................................. 9-097538

[51] Int. Cl.$^6$ ............................. H04N 1/32; G06F 15/00
[52] U.S. Cl. ........................................... 358/468; 395/114
[58] Field of Search ................................... 358/468, 404, 358/437, 438, 439, 441, 442, 443, 444; 395/114

[56] References Cited

U.S. PATENT DOCUMENTS

| | | | |
|---|---|---|---|
| 5,357,562 | 10/1994 | Metser | 379/67 |
| 5,684,607 | 11/1997 | Matsumoto | 358/442 |
| 5,778,198 | 7/1998 | Kadota | 395/286 |
| 5,818,609 | 10/1998 | Yamamuro | 358/468 |

*Primary Examiner*—Jerome Grant, II

[57] ABSTRACT

This invention is directed to a facsimile machine adapted for being connectable with an external computer and being capable of conducting a certain communication operation upon receiving a command data in a certain command type from the externally connected computer in handshaking manner. The facsimile machine includes a communication interval extension means for extending a data communication time interval with the externally connected computer by a predetermined time duration; and operation control means for carrying out the communication operation in the extended communication time interval and a facsimile machine oriented operation in a vacant time residing in the data communication time interval when the facsimile machine oriented operation and the communication operation are commanded at the same time to perform a parallel processing of the communication operation and the facsimile machine oriented operation.

16 Claims, 17 Drawing Sheets

FACSIMILE MACHINE

BACKGROUND OF THE INVENTION

This invention relates to a facsimile machine, which is connectable with an external computer in a handshake type manner, and capable of carrying out a certain communication operation in accordance with a command issued from the externally connected computer.

Conventionally, it has been known of a facsimile machine, which has an interface such as an RS-232C and a parallel interface to enable a communication with an externally provided computer via the interface.

With the conventional type facsimile machine, it has been possible to carry out mainly two types of operations, but not limited thereto; one type operation includes such as facsimile data receipt or transmission and a copying operation (hereinafter referred to as a facsimile machine oriented operation) that can be conducted by the facsimile machine alone, and the other type operation includes such as a print out operation of the data sent from the externally provided computer or receipt or transmission of the data sent from the externally provided computer upon issuance of the command from the externally provided computer (hereinafter referred to as a communication operation).

However, with the aforementioned facsimile machine, it has not been possible to carry out a so-called parallel process (carrying out the two different operations in parallel manner). Specifically, when the facsimile machine, during execution of the machine oriented operation, receives an interrupt signal for communication operation from the external computer, the facsimile machine can not perform the two operations, machine oriented operation and communication operation, in parallel manner due to an excessive increase of load in a control unit of the facsimile machine main body. Accordingly, what was possible with the aforementioned facsimile machine other than the parallel process is to conduct the communication operation after completion of the facsimile machine oriented operation. As a result, the communication operation from the external computer with the use of such facsimile machine was far below what was desired in view of operational efficiency and operability. Thus there certainly exists room for an improvement in view therefrom.

SUMMARY OF THE INVENTION

It is an object of this invention to overcome the above problems residing in the conventional type facsimile machine as described in the above section.

It is another object of this invention to provide a facsimile machine which can perform the so-called parallel process, resulting in achieving high operation efficiency and operability with respect to the communication operation request from the externally provided computer.

To fulfill the above objects according to this invention, the facsimile machine which is adapted for being connectable with an external computer and being capable of conducting a certain communication operation upon receiving a command data in a certain command type from the externally connected computer in handshaking manner.

The facsimile machine includes: communication interval extension means for extending a data communication time interval with the externally connected computer by a predetermined time duration; and operation control means for carrying out the communication operation in the extended communication time interval and a facsimile machine oriented operation in a vacant time residing in the data communication time interval when the facsimile machine oriented operation and the communication operation are commanded at the same time to perform a parallel processing of the communication operation and the facsimile machine oriented operation.

With the thus constructed facsimile machine, the time interval required for the data communication with the externally connected computer is extended by a certain time duration. The communication operation is carried out in the extended time interval while in this time interval what is found is a vacant time period residing in between each of data communication operations. The facsimile machine oriented operation is carried out in the vacant time period residing in the extended time interval. Accordingly, over the span of extended time interval, two types of operations, the communication operation and the facsimile machine oriented operation, are carried out in parallel manner. Thus even when the two operations are demanded at the same time, both operations can be carried out in an efficient manner.

These and other objects, features and advantages of the present invention will become more apparent upon reading the following detailed description and accompanying drawings.

DETAILED DESCRIPTION OF THE PREFERRED EMBODIMENTS OF THE INVENTION

Figure 1:
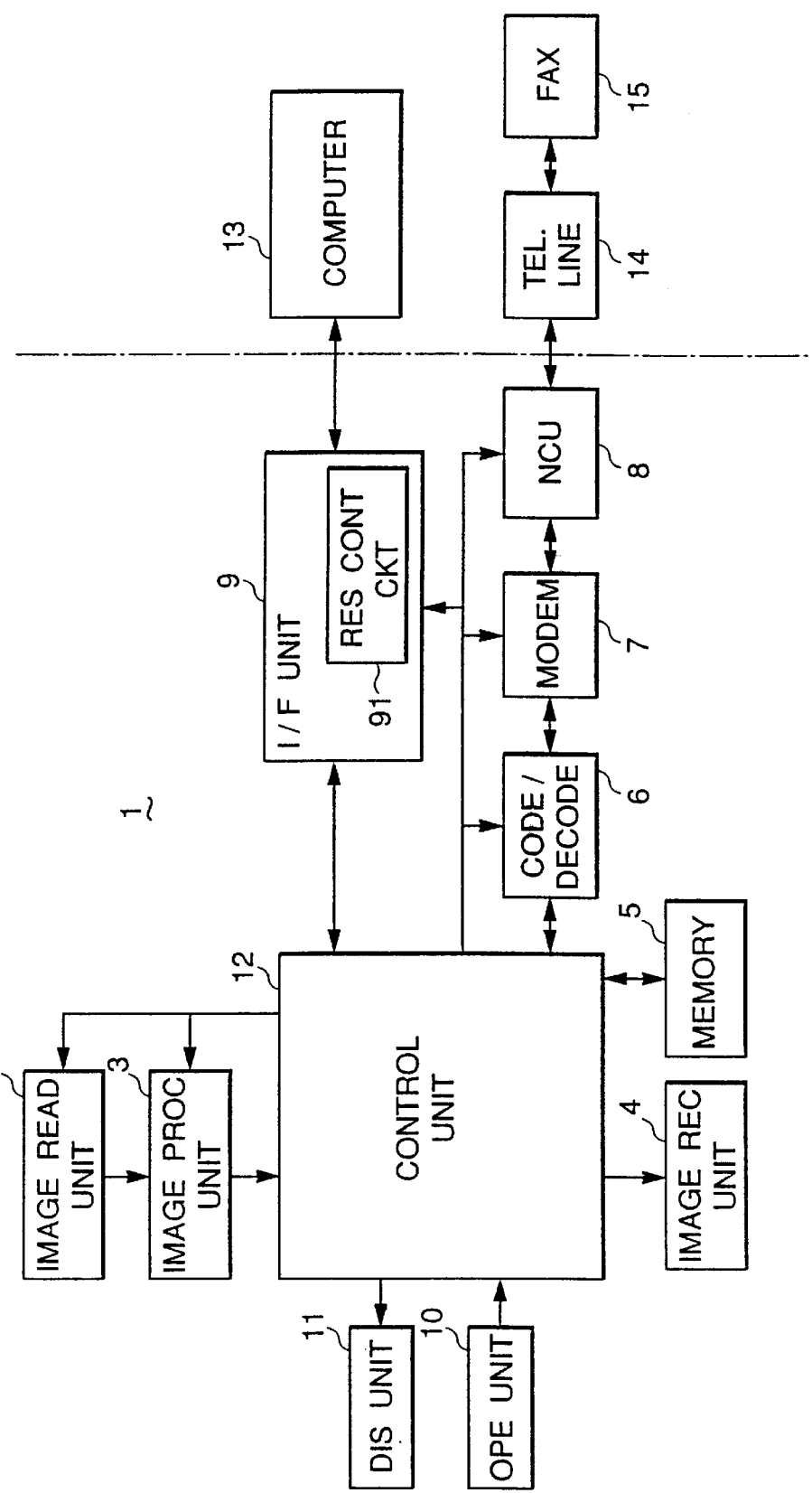
FIG. 1 is a block diagram showing a first embodiment of a facsimile machine of this invention.

FIG. 1 is a block diagram showing a first embodiment of a facsimile machine of this invention.

The facsimile machine 1 is connectable with an externally provided computer 13 and has a facsimile function enabling the facsimile machine oriented operation and a communication function enabling a communication operation based on a command of the externally connected computer 13. Further, the facsimile machine 1 has a parallel process function enabling the communication operation and the facsimile machine oriented operation in parallel manner when the communication operation from the external computer interrupts the facsimile machine 1 in the execution of facsimile machine oriented operation by slowing down a communication speed with the external computer below its normal level.

The parallel process is performed in the following manner. When the facsimile machine 1 in execution of the facsimile machine oriented operation is interrupted by the command of communication operation from the external computer 13, the time interval for data communication with the computer 13 is extended to perform the communication operation at a slower communication speed. During this extended time interval, a small time gap (hereinafter referred to as a vacant time period) exists between a completion time of a single data communication and a start time of next single data communication and the facsimile machine oriented operation is carried out over the vacant time period.

The facsimile machine 1 has a image reading unit 2, an image processing unit 3, an image recording unit 4, a memory 5, a coding/decoding unit 6, a modulator & demodulator (a modem) 7, an NCU (network control unit) 8, an interface unit 9, an operation unit 10, a display unit 11 and a control unit 12.

The image reading unit 2 reads an image of an original document to be transmitted to another facsimile machine 15 at the other end. The image processing unit 3 performs a certain processing (such as level correction, γ correction, A/D conversion and so forth). The image reading unit 2 has an auto document feeder for feeding the document which is set and an photograph unit made of a CCD (Charge Coupled Device) line sensor. The image reading unit 2 moves the photograph unit relative to the document for scanning the document to read out the document image line by line in the feeding direction and outputs the scanned image to the image processing unit 3.

The image recording unit 4 prints out the data on a recording sheet; the data includes such as data read out by the image reading unit 2 (hereinafter referred to as read-out data), data transmitted from the facsimile machine 15 (hereinafter referred to as receipt data) and data transmitted from the externally connected computer 13 (hereinafter referred to as PC data). The image recording unit 4 is of a type such as a laser printer. The image recording unit 4 projects the laser beam modulated by the pixel data, constituting the image to be recorded (hereinafter referred to as a print image), onto a photosensitive drum to form a latent image. Subsequently, the toner is electrostatically attracted to the latent image to form a toner image and the toner image is transferred onto a recording sheet (i.e., a copy sheet).

The memory 5 stores the previously mentioned read-out data, the receipt data, and the PC data and is preferably, but not limited thereto, a memory with large capacity storing the data as much as 100 page A4 documents. The memory 5 is used for the operations of receiving and transmitting the facsimile data in such a manner that the facsimile data is once stored in the memory for either operation.

The coding/decoding unit 6 compresses and encodes the data (image data) to be fax transmitted and expands and decodes the received facsimile data. The modulator/demodulator 7 modulates the compressed/coded image data to voice signals and demodulates the received facsimile signals (voice signals) to the image data. The NCU 8 is a device for enabling connection of the facsimile machine 1 with another facsimile machine 15 on the other end via a telephone line 14.

The interface unit 9 is used for connecting the externally provided computer 13 to the facsimile machine 1 and in this embodiment it is of a type in accordance with an IEEE-1284 standard. Further, the interface unit 9 has a response control circuit 91 for extending, by means of hardware manipulation, a time interval of data communication with the computer 13 in connection with the facsimile machine 1 in handshake manner.

Note that the interface unit 9 is not limited to the one accorded with the aforementioned standard as long as it enables a communication with the externally provided computer 13 by way of connection thereto.

The operation unit 10 is used for inputting the facsimile number of recipient, starting/ceasing the facsimile transmission, registration of one touch key or shortened number, and setting of various modes such as a copy mode and a facsimile mode. The operation unit 10 is provided on an operation panel of the facsimile machine 1 and has a variety of key switches such as ten keys and one touch key.

The display unit 11 includes a LCD (Liquid Crystal Display) and an LED (Light Emitted Diode). The display unit 11 displays information in character on the LCD regarding a line connection status, a transmission status, a communication status with an externally provided computer 13 and recipient's name and its facsimile number. In addition, the display unit 11 also displays on the LED information regarding the presence/absence of communication error, a set mode, an image quality of data in receipt, the presence/absence of data in the memory, and the necessity of maintenance work. The display unit 11 is also provided on the operation panel of the facsimile machine 1.

Figure 2:
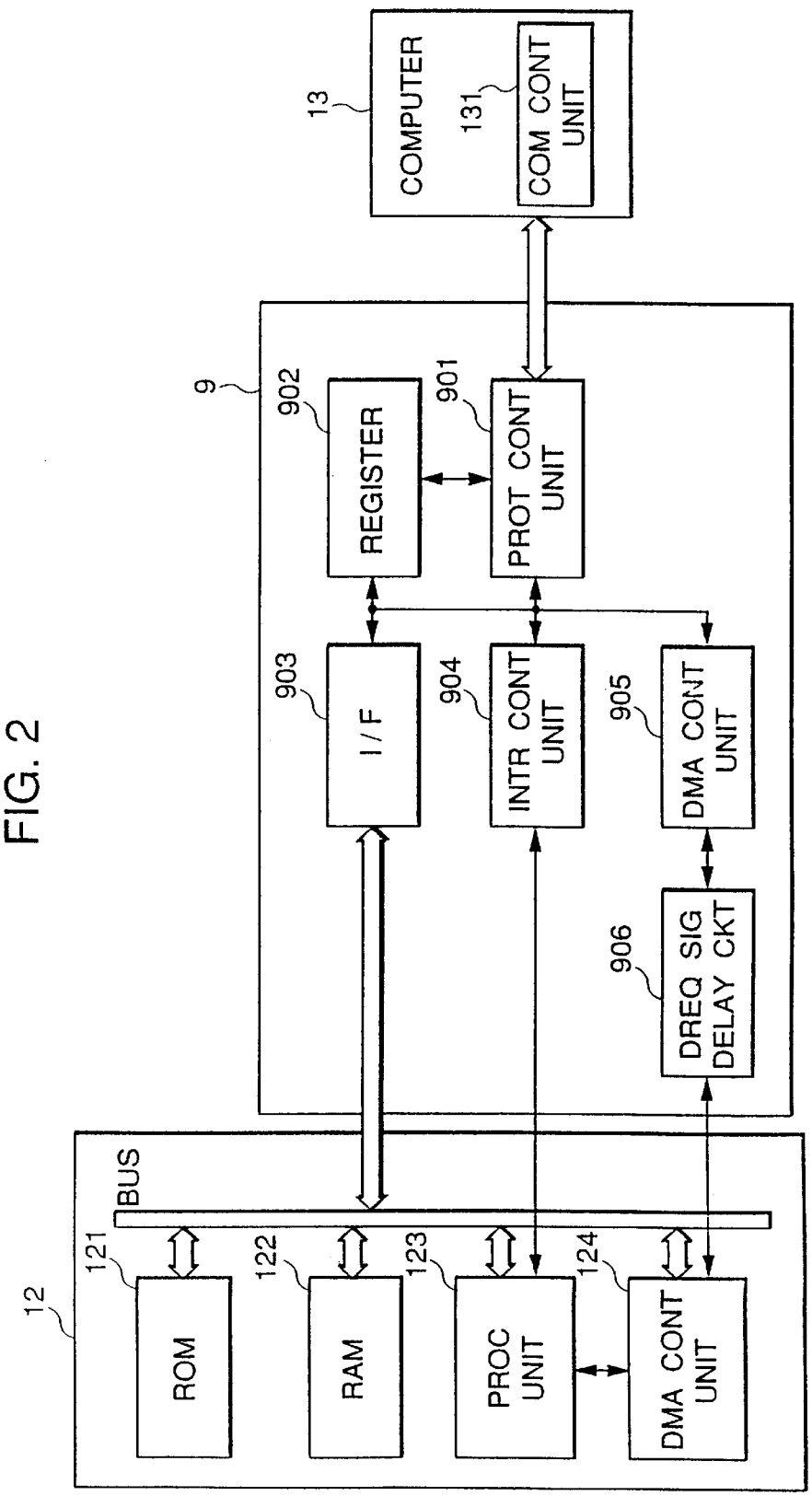
FIG. 2 is a block diagram showing an interface section of the first embodiment.

The control unit 12 is essentially comprised of a microcomputer to control the operations of all the aforementioned units, namely the image reading unit 2 to the interface unit 9 and the display unit 11 for controlling the facsimile, copy, and the data transmission functions of the facsimile machine 1. The control unit 12 includes, as shown in FIG. 2, a ROM (Read Only Memory) 121, a RAM (Random Access Memory), a processing unit 123, and a DMA (Direct Memory Access) control unit 124.

The ROM 121 is a memory storing programs such as a processing program and a communication program for executing the facsimile function and the communication function with the computer 13 and, but not limited thereto, data such as processing data of individual operation (for instance, the data regarding the operative conditions such as light emitting amount of a light source of the image reading unit 2, developing density of the image recording unit 4, warning & operation procedure messages). On the other hand, the RAM 122 is a memory (as a main storage section) for processing certain operations in accordance with the above mentioned processing programs.

The processing unit 123 executes each task (such as receipt/transmission of facsimile data, copying, data communication with the computer 13) in accordance with the aforementioned programs. The DMA control unit 124 controls a DMA transmission of the data sent from the externally provided computer 13 to the RAM 122 via the interface unit 9.

The facsimile machine 1 has the communication program with the use of AT command system to execute the communication with the computer 13 in accordance with the AT command. However, the command type is not limited to the AT command type and may be of a command type recommended as the class one command type or the class 2 command type standardized by an EIC (American Electric Industry Commission). Furthermore, the command type may also be its original command type.

FIG. 2 is a block diagram showing the interface unit 9, in particular, of the first embodiment.

The interface unit 9 has a protocol control unit 901, a register 902, an I/F 903, an interruption control unit 904, an EMA control unit 905, and a DREQ signal delay circuit 906. The protocol control unit 901, the register 902, the I/F 903, the interruption control unit 904, and the EMA control unit 905 constitute a control circuit for controlling the operations of the interface unit 9 in accordance with an IEEE-1284 standard. And the DREQ signal delay circuit corresponds to the response control circuit 91.

The protocol control circuit 901 executes the data communication with the computer 13 by way of controlling the communication procedures with the computer 13. The computer 13 has a communication control unit 131 for controlling respective communication ports, and the protocol control circuit 901 carries out the handshake type data communication through the communication control unit 131 in accordance with the certain communication procedures.

The register 902 stores the data (such as command data or data to be processed) sent from the computer 13 and the I/F 903 is an interface for passing the data stored in the register 902 to the control unit 12.

The protocol control unit 901, upon receipt of the data sent from the computer 13, stores the data in the register 902 and outputs a signal indicating "the presence of the data in receipt" to either one of the interrupt control unit 904 or the DMA control unit 905 for transmitting the data to the control unit 12.

The interruption control unit 904 controls the output of a signal requesting the interruption (hereinafter referred to as an Interruption request signal) in the processing unit 123 of the control unit 12 and the DMA control unit 905 controls the output of a signal requesting the DMA transmission of the data sent from the computer 13 (hereinafter referred to as a DMA transmission request signal) to the control unit 12.

The interruption control unit 904, upon receipt of signal of the command data indicating the presence of the data in receipt, sends the interruption request signal to the processing unit 123 for transmitting the command data to the control unit 12. The processing unit 123, when receiving the interruption request signal, reads out the command data from the register 902 via the I/F 903 to reset the interruption request signal and to carry out the certain interruption process in accordance with the command.

The DMA control unit 905, when receiving the signal from the protocol control unit 901 indicating the presence of received data to be processed (the data to be DMA transmitted to), outputs the DMA transmission request signal to the DMA control unit 124 for transmitting the data to the control unit 12. In reply to the DMA transmission request signal, the DMA control unit 124 gives back a signal indicating the permission of DMA transmission (hereinafter referred to as a DMA transmission permit signal) and outputs the address data to each data to be DMA transmitted. On the other hand, the DMA control unit 905, when receiving the DMA transmission permit signal from the DMA control unit 124, sends the data stored in the register 902 to the side of control unit 12 via the I/F 903. Once the data is sent to the control unit side, the data is passed onto the RAM 122 via data bus and is stored in the respective area in accordance with the address data assigned and outputted from the DMA control unit 124.

The DREQ signal delay circuit 906 delays the input timing of the DMA transmission request signal outputted from the DMA control unit 905 to the DMA control unit 124 by a certain time duration Δt. The DMA transmission request signal is inputted to the DMA control unit 124 at a time delayed from the time of output from the DMA control unit 905 by the time duration Δt, resulting in the extension of the DMA transmission time interval for each data by the time duration Δt. This, in fact, is equivalent to lowering of the data transmission speed from the computer 13, rendering the to lower the communication processing speed.

In this way, the DREQ signal delay circuit 906 produces the time duration Δt in the DMA transmission time interval which is not utilized for the data transmission operation. Thus the use of this small time duration Δt for executing the facsimile machine oriented operations, in such a manner the facsimile machine oriented operation is divided to plural segments in time and puts the segment of facsimile machine oriented operation into the small time duration Δt, enables the execution of the parallel process of facsimile machine oriented operation and the communication operation.

Figure 3:
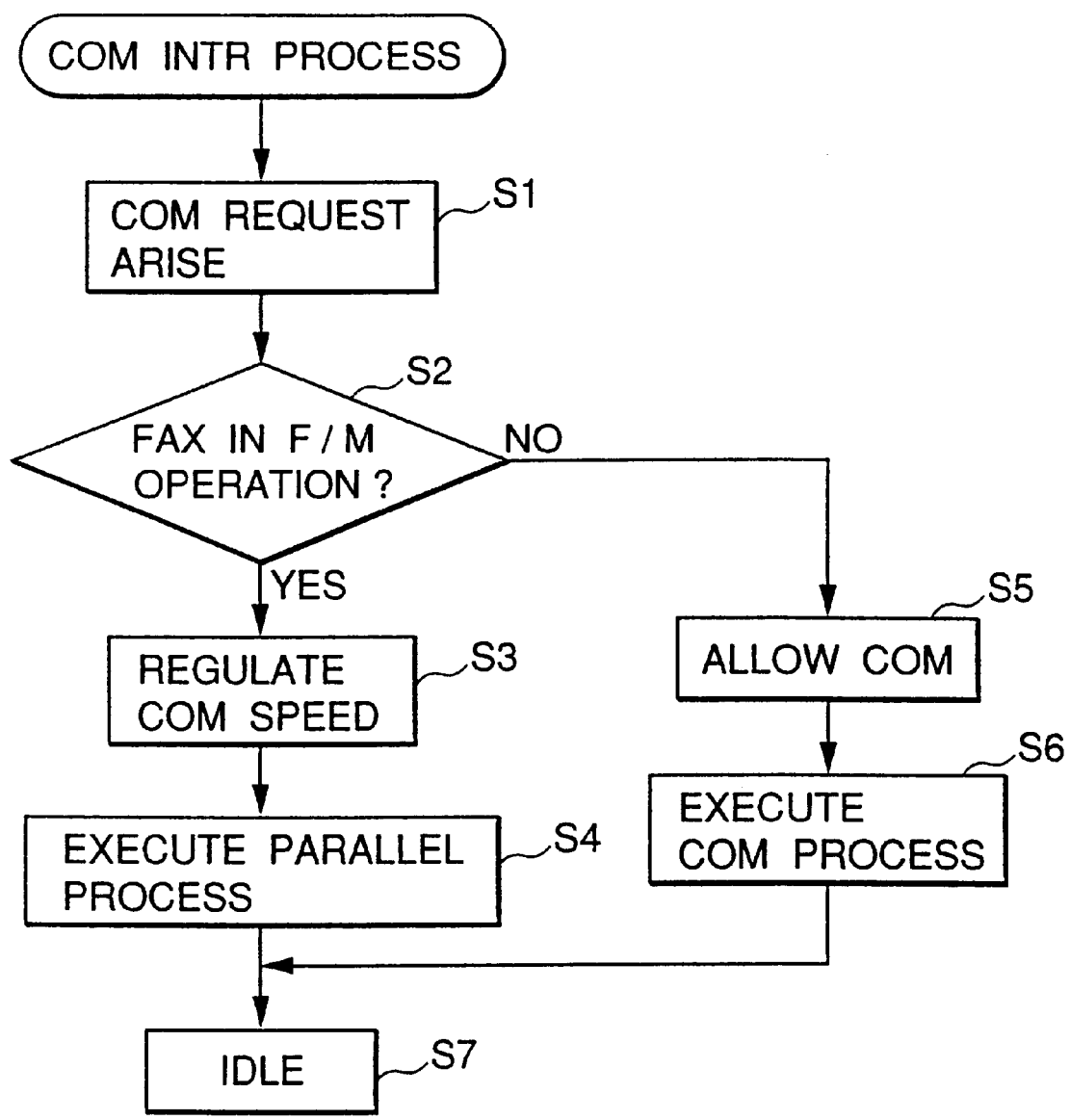
FIG. 3 is a flowchart illustrating an interrupting operation for communication with an externally provided device such as a computer.

The delayed time duration Δt of the DREQ signal delay circuit 906 can be adjusted and is controlled by the processing unit 123 of the control unit 12 in accordance with the "interruption process" illustrated in the flowchart of FIG. 3.

Referring now to FIG. 3, when the interruption signal is sent to the processing unit 123 from the interface unit 9, the communication process begins with the computer 13 (step S1). At step S2, it is determined if the processing unit 123 is in process of facsimile machine oriented operation such as setting the facsimile transmission condition, registration of facsimile transmission operation, receiving operation, copy operation, one touch/shortened dial and other use's set conditions (i.e., receipt/transmission mode, quality of received image). Then if the answer at the step S2 is affirmative, the delayed time duration Δt of the DREQ signal delay circuit 906 is set to be a certain value at step S3. And then the parallel process of facsimile machine oriented and communication operations is carried out (at step S4). In other words, the communication with the computer 13 begins and by setting a delayed time duration Δt, a vacant time (time not utilized for data communication) in the data transmission time interval with the computer 13 is produced. Utilizing this vacant time, the facsimile machine oriented operation can be intermittently carried out.

Furthermore, the aforementioned delayed time duration Δt is set in consideration of the contents of the facsimile machine oriented operation currently in process. For instance, when the facsimile machine 1 is in process of fax data transmission/receipt or copying operation, as this type of facsimile machine oriented operation requires a certain processing speed, the delayed time duration Δt is preferably set at relatively larger value in such a manner as to make the communication speed with the computer 13 less than 100 kbites/sec. On the other hand, when the facsimile machine 1 is in process of setting of fax transmission conditions, registration of one touch/shortened dial or user's settable conditions, as these operations do not require the particular execution speed, the delayed time duration Δt is set at relatively small value in such a manner as to make the communication speed with the computer 13 less than 200 KB/sec, faster than that of former case. Note that it may be possible that the delayed time duration Δt is set at some value only when the facsimile machine 1 is in process of former case and for the latter case the facsimile machine oriented operation can be halted for executing the communication operation with higher priority.

Now referring back to FIG. 3 again, when the facsimile machine 1 is not in process of facsimile machine oriented operation (i.e., a standby state and "No" at Step S2), the delayed time duration Δt is set to be "0" at step S5, thus data communication with the computer 13 is carried out for its normal communication speed (at step S6). Subsequently, the communication interruption process is complete and the facsimile machine is put into an idle state (communication interruption allowable state at step S7).

Figure 4:
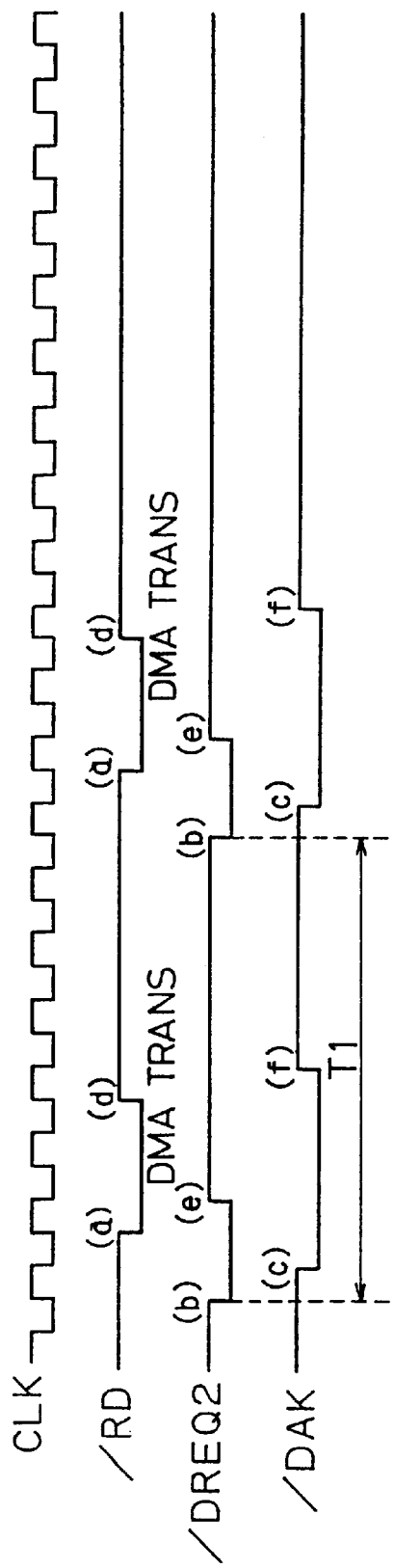
FIG. 4 is a diagram showing one example of response wave of each signal between the interface section and a control section of the first embodiment when the communication speed with the externally provided computer is of standard level.

Referring to FIG. 4, it is shown one example of response wave of each signal between the interface unit 9 and the control unit 12 at the normal communication speed. Also, referring to FIG. 5, it is shown one example of response wave of each signal between the interface unit 9 and the control unit 12 at the controlled (regulated) communication speed.

Figure 5:
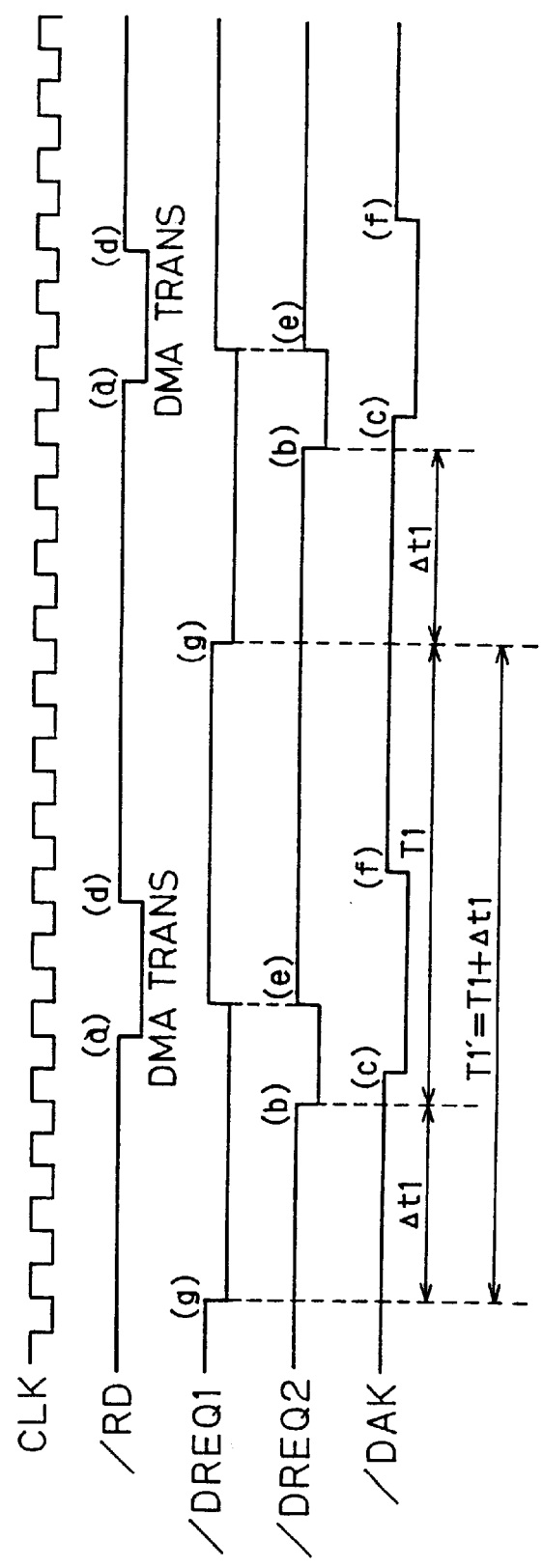
FIG. 5 is a diagram showing one example of response wave of each signal between the interface section and a control section of the first embodiment when the communication speed with the externally provided computer is regulated.

In FIGS. 4 & 5, a signal "CLK" represents a clock signal for data transmission between the interface unit 9 and the control unit 12 and is outputted to the control unit 12 through the interface unit 903. A signal "/RD" represents a low active signal indicating that the DMA data transmission is carried out from the interface unit 9 to the control unit 12 when the signal is at its low level.

In addition, a signal "/DREQ1" represents a DMA transmission request signal outputted from the DMA control unit 905 and a signal "/DREQ2" represents a DMA transmission request signal sent from the DREQ signal delay circuit 906 to the DMA control unit 124. Both "/DREQ1" and "/DREQ2" signals are low-active signals and when the signal "/RD" is switched down to initiate the DMA data transmission (see a timing (a)), then the both /DREQ1 and /DREQ2 signals are switched to the high level (see a timing (e)) to terminate the respective enabling states. Note that the signals "/RD", "DREQ1", and "DREQ2" may be of the high active signals.

In FIG. 4, the delayed time duration Δt1 is set to "0", thus the signal "/DREQ1" is identical with the signal "/DREQ2". As a result, the illustration of signal "/DREQ1" in FIG. 4 is omitted. Referring to FIG. 5, the timing of termination of enabling state of the signal "/DREQ1" is the same as that of the signal "/DREQ2" (see the timing (e)); however, the timing for the signal "/DREQ2" to be enabling state (see the timing (b)) is delayed from the timing for the signal "/DREQ1" to be enabling state (see the timing (g)) by the delayed time duration Δt1 as the DREQ signal delay circuit 906 is interposed.

A signal "/DAK" is a DMA transmission permit signal which is sent from the DMA control unit 124 to the DREQ signal delay circuit 906. The signal "/DAK" is a low active signal and thus it becomes enabling state for the data transmission when the signal "/DAK" is at low level. The DMA control unit 124, when the signal "/DREQ2" becomes the enabling state (see the timing (b)), switches the signal "/DAK" from its high level to its low level for enabling the DMA data transmission from the interface unit 9 (see the timing (c)). On the other hand, the DREQ signal delay circuit 906, when the signal "/DAK" switches from its high level to the low level, begins the data transmission (see the timing (a)). In addition, the DMA control unit 124, when the DMA data transmission from the interface 9 is complete (see the timing (d)), switches the signal "/DAK" from its low level to the high level to prohibit the DMA data transmission from the interface unit 9 (see the timing (f)).

As being obvious from FIGS. 4 and 5, the enabling time duration "T1" of the signal "/DREQ2" (i.e., the DMA data transmission time interval T1) is extended to the time duration T1' (i.e., equal to summation of "T1" & "Δt1") due to the fact that the delayed time duration Δt1 is set. Accordingly, the time duration Δt1 which is not consumed by the data communication operation with the computer 13 is created in the DMA data transmission interval T1'. As a result, the processing unit 123 executes the facsimile machine oriented operation in such a manner that the facsimile machine oriented operation is divided into the segments in time, enabling the parallel processing of the two kinds of operations, the facsimile machine oriented operation and the communication operation.

A second embodiment of this invention is hereinafter described with reference to FIG. 6.

In the first embodiment, the parallel process is executed by extending the data communication time interval for the DMA transmission operation; on the other hand, in the second embodiment, the parallel process is executed by extending the data communication time interval for the command data.

Figure 6:
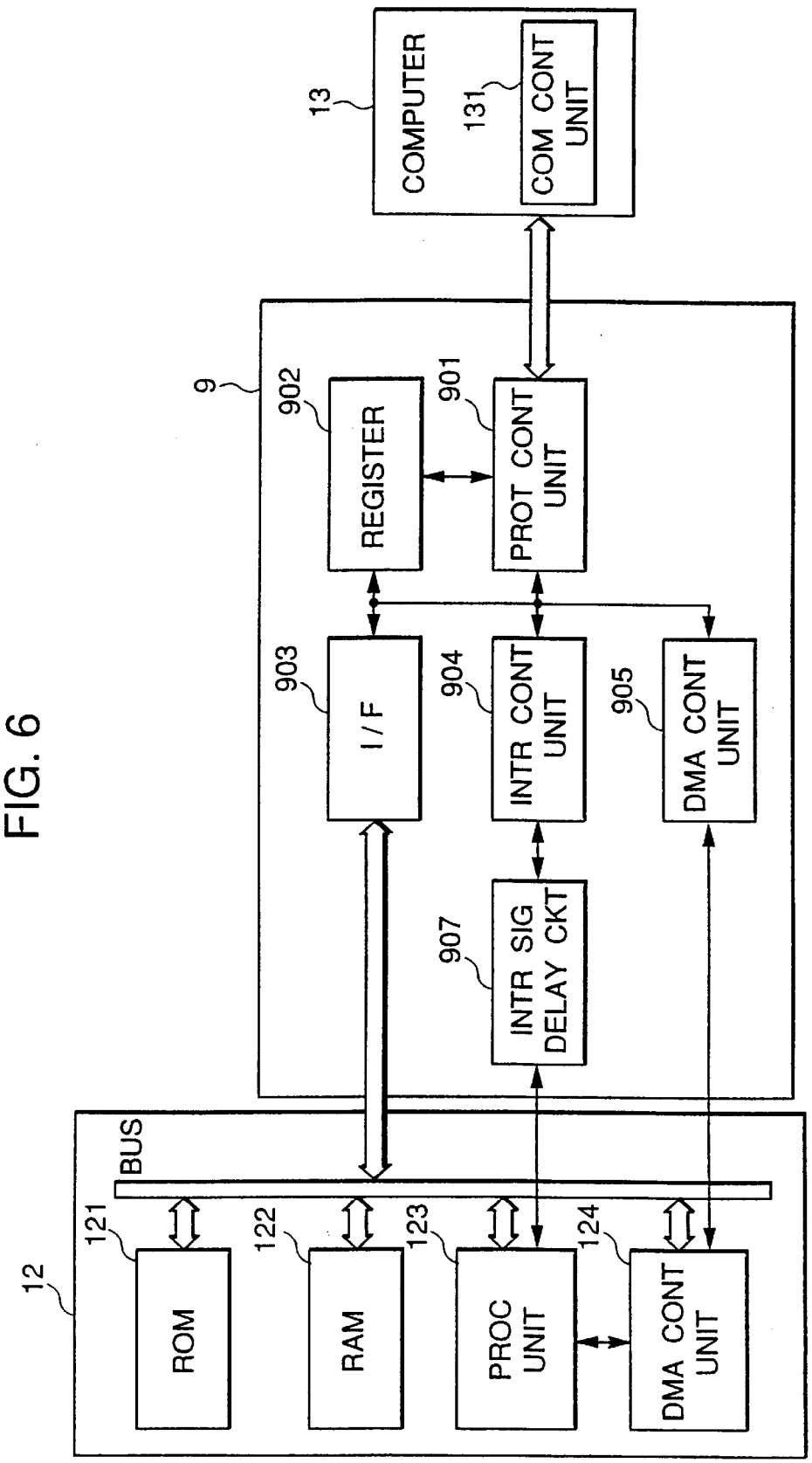
FIG. 6 is a block diagram showing an interface section of a second embodiment of this invention.

Accordingly, in FIG. 6, instead of the DREQ signal delay circuit 906 of FIG. 2, an interruption request signal delay circuit 907 (corresponding to a response control circuit 91) is provided between the interruption control unit 904 in the interface unit 9 and the processing unit 123.

The interruption request signal delay circuit 907 delays the input timing of the interruption request signal outputted from the interruption control unit 904 to the processing unit 123 by a certain time duration Δt. The interruption request signal is inputted to the processing unit 123 with a time delay Δt from the time the interruption request signal is outputted from the interruption control unit 904, thus as in the case of the DMA data transmission, the data transmission time interval for each data is extended by the time duration Δt, rendering that the communication speed with the computer is lowered than its normal communication speed. As a result, now being able to execute is the facsimile machine oriented operation during the extended time duration Δt in the time sharing manner (i.e., dividing the facsimile machine oriented operation into a plurality of segmental operations and each segmental operation is executed in the extended time duration Δt), enabling the parallel processing of two kinds of operations, the facsimile machine oriented operation and the communication operation.

Note as in the first embodiment, the extended time duration Δt2 of the second embodiment can be set, depending upon the contents of the facsimile machine oriented operation.

Figure 7:
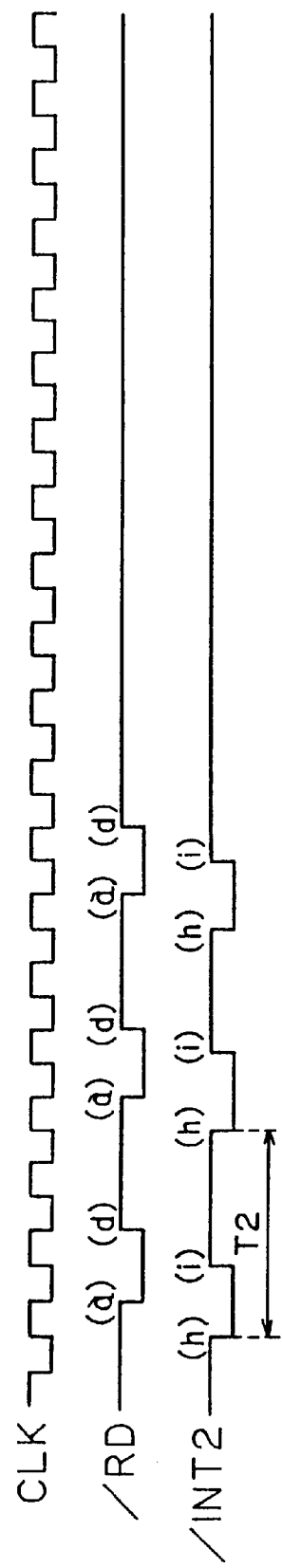
FIG. 7 is a diagram showing one example of response wave of each signal between the interface section and a control section of the second embodiment when the communication speed with the externally provided computer is of standard level.

FIG. 7 shows a response wave for each signal transmitted between the interface unit 9 and the control unit 12 of the second embodiment when the data communication speed with the computer 13 is set at its normal speed. Whereas, FIG. 8 shows a response wave for each signal transmitted between the interface unit 9 and the control unit 12 of the second embodiment when the data communication with the computer 13 is limited.

Figure 8:
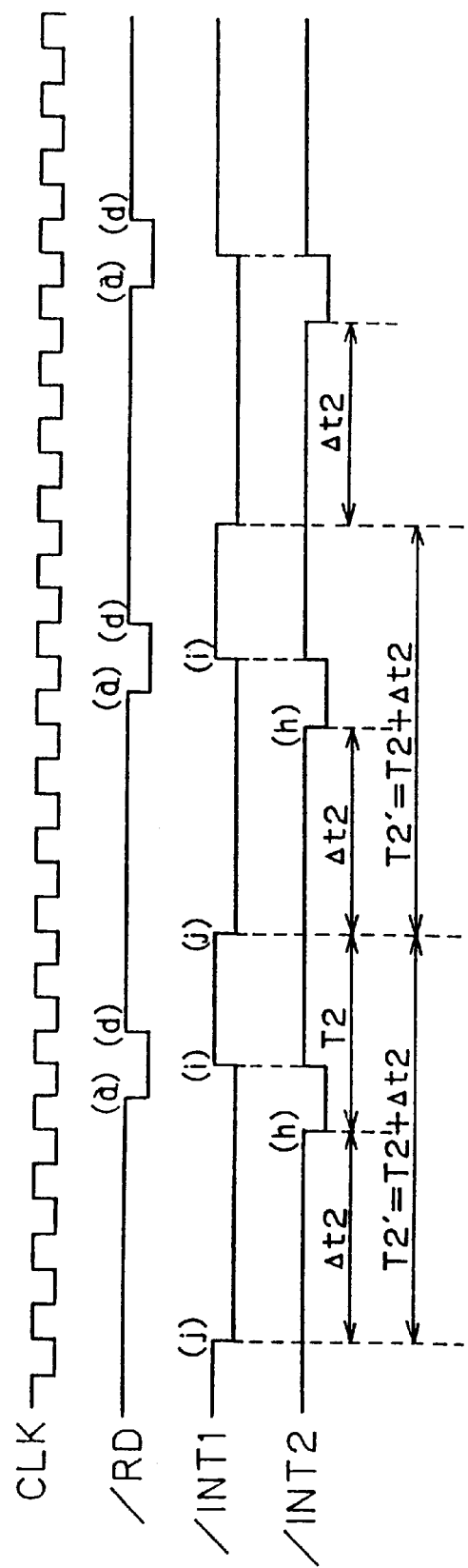
FIG. 8 is a diagram showing one example of response wave of each signal between the interface section and a control section of the second embodiment when the communication speed with the externally provided computer is regulated.

The signals "CLK" and "/RD" in FIGS. 7 & 8 are the same as those described along with FIGS. 4 & 5. A signal "/INT1" is an interruption request signal outputted from the interruption control unit 904 and a signal "/INT2" is an interruption request signal to be inputted from the interruption delay circuit 907 to the processing unit 123. The signals "/INT1" & "/INT2" are low active signals thus when the signal "/RD" is switched to low level to initiate the command data transmission (at the timing (a)), the signals "/INT1" & "/INT2" are switched to high level to terminate the enabling states (at the timing (i)). Note that the signals "/INT1" & "/INT2" can be the high active signals, i.e., being enabling state at high level.

In FIG. 7, the delayed time duration Δt is set to "0", the signal "I/INT1" becomes identical with the signal "/INT2" thus illustration of the signal "/INT1" is omitted. In FIG. 8, the termination timing of the enabling state of the signal "/Int1" (see the timing (i)) is the same as the timing of the enabling state of the signal "/INT2"; however, the timing for the signal "/INT2" to become enabling state (see the timing (h)) is delayed from the timing for the signal "INT1" to become enabling state (see the timing (j)) by the time duration, Δt2 due to the fact that the interruption request signal delay circuit 907 is interposed.

When the signal "/INT2" switches to the enabling state (see the timing (h)), then the command data stored in the register 902 is read out via the interface unit 903. Subsequently, the enabling state of the signal "/INT2" is terminated (see the timing (i)).

As being obvious from FIGS. 7 & 8, the time interval for the signal "/INT2" becoming the enabling state is extended to the time interval T2' of command data transmission, equal to the original time interval T2 plus the delayed time duration Δt2 thus creating the time duration Δt2 in the data transmission time interval that is not utilized for the communication with the computer 13. Accordingly, the processing unit 123 executes the facsimile machine oriented operation during the time duration Δt2 in the time sharing manner, enabling the parallel processing of two kinds of operations, the facsimile machine oriented operation and the communication operation.

In the aforementioned second embodiment, the data transmission interval of the command data from the interface unit 9 to the control unit 12 is extended by delaying the input timing of the interruption request signal to the processing unit 123; however, the same is achieved by limiting the time interval at the processing unit 123 for receiving the interruption request signal. In this latter case, the facsimile machine oriented operation is executed during the interruption prohibit time in the time sharing manner, enabling the parallel processing of two kinds of operations, the facsimile machine oriented operation and the communication operation.

In the latter case, the interruption receiving time interval can be adjusted in manipulation of the software; thus it is easier than the adjustment by the hardware manipulation. Accordingly, a third embodiment of this invention adapting a method of limiting the interruption receiving time interval can eliminate the interruption request signal delay circuit 907 from FIG. 6.

Figure 9:
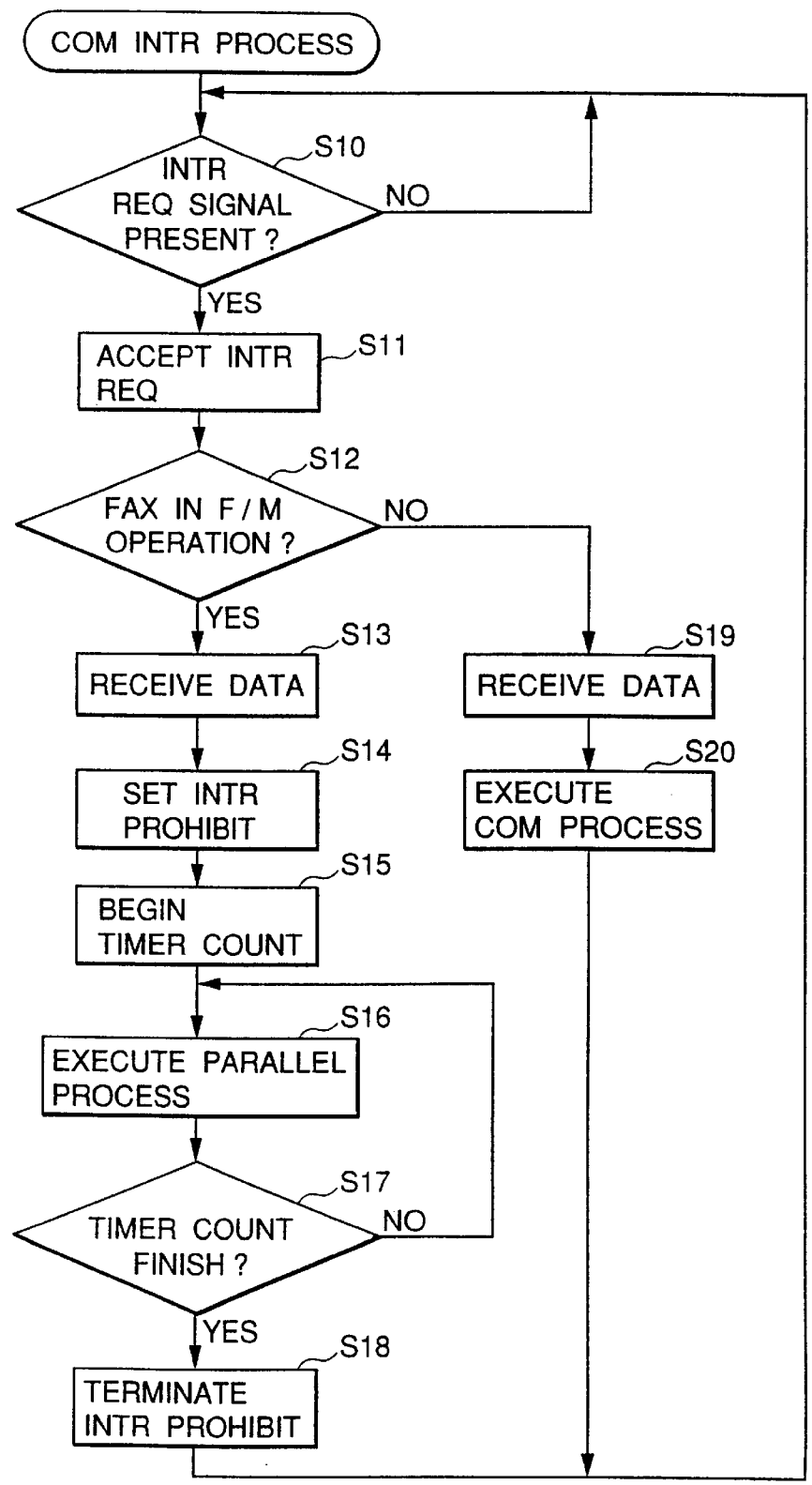
FIG. 9 is one flowchart illustrating an operation of restricting an interrupting interval from the interface section.

Now referring to FIG. 9, it is shown one example of flowchart illustrating the interruption control, which enables the execution of the parallel process by regulating the interruption receiving interval.

In this flowchart, at step S10, it is determined if the interruption request signal is inputted from to the processing unit 123 from the interruption control unit 904 of the interface unit 9. If the answer at step S10 is affirmative, then the routine goes to the step S11 to receive the interruption for facsimile machine 1 to become the interruption permit state.

Subsequently, at the step S12, if the processing unit 123 is in process of facsimile machine oriented operation is determined. Then if the processing unit 123 is in the process of facsimile machine oriented operation ("Yes" in the step S12), the access to the register 902 in the interface unit 9 is attempted to read the command data therefrom at step S13. Then the interruption prohibit state for prohibiting the acceptance of the next interruption request signal is set at step S14. Subsequently, at step S15, the timer count begins for maintaining the interruption prohibit state for a predetermined period of time (i.e., about 400 μs). Then until the predetermined time period elapses, the parallel process operations; the communication process in accordance with the command data and the facsimile machine oriented operation which is currently in progress, will continue (in loop made of the steps S16 & S17).

When the predetermined time period has elapsed ("Yes" in step S17), the interruption prohibit state is terminated (step S18). Then the routine returns to the step S10 to make the facsimile machine 1 in the standby state for the incoming interruption request signal.

On the other hand, when the processing unit 123 is not in the process of the facsimile machine oriented operation ("No" in step S12), the access is made to the register 902 of the interface unit 9 to read the command data therefrom (step S19). Subsequently, the communication process in accordance with the command data is carried out (step S20). Thereafter the routine goes back to the step S10 to become standby state for incoming interruption request signal.

Figure 10:
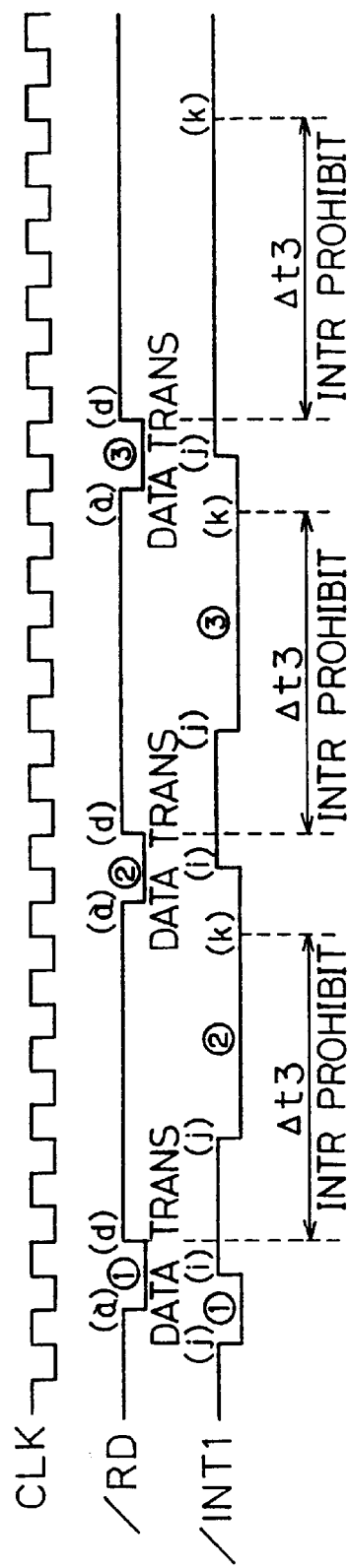
FIG. 10 is a diagram showing one example of response wave of each signal between the interface section and a control section of a third embodiment when an interruption receipt interval is regulated with software.

FIG. 10 shows an example of response wave for each signal between the interface unit 9 and the control unit 12 when the interruption receiving interval is by way of software manipulation regulated.

In this FIG. 10, a signal "CLK", a signal "/RD", a signal "/INT1" are identical with those described in FIG. 8. When a first interruption request signal "/INT1" is inputted to the processing unit 123, the command data stored in the register 902 of the interface unit 9 is read into the processing unit 123 in accordance with the first interruption request signal "/INT1" (see the data read out process ①) and is set to the interruption prohibit state for prohibiting the interruption of a second interruption request signal.

The aforementioned interruption prohibit state is maintained for a certain time period Δt3. Thus during this time period Δt3, even if the interruption control unit 904 makes the second interruption request signal "/INTI" to the enabling state, the processing unit 123 does not accept the second interruption request signal "I/INT1" so as to continue executing the facsimile machine oriented operation until the Δt3 elapses. The interruption control unit 904 can not transmit a third interruption request signal "/INTI" until the command data stored in the register 902 is transferred to the processing unit 123, thus the enabling state of the second interruption request signal "/INT1" continues until the command data stored in the register 902 is transferred to the processing unit 123 (see data read out process ②).

After reading in the command data, when the interruption prohibit time period Δt3 elapses (see the timing (k)), the command data stored in the register 902 of the interface unit 9 is read into the processing unit 123 in accordance with the second interruption request signal "/INT1" (see the data read in process ②). Consequently, the interruption prohibit state at the control unit 12 is set again for prohibiting acceptance of the third interrupt request signal "/INT1", thus in the interface unit 9, the enabling state of the second interruption request signal "/INT1" is terminated and the enabling state of the third interruption request signal "I/INT1" becomes in effect.

Note that in the third embodiment of this invention, the interruption prohibit time duration Δt3 can be adjusted based on the contents of the facsimile machine oriented operations.

Summing up the aforementioned three embodiments, namely the first to third embodiments, the data transmission time interval, when transferring the data sent from the computer 13 from the interface unit 9 to the control unit 12 of the facsimile machine main body, is extended to eventually extend the data communication time interval with the computer 13. Accordingly, this act does not violate the standardized communication protocol to provide the facsimile machine capable of executing the parallel process with simplicity and ease.

Especially in the first embodiment, the input timing of the DMA transmission request signal "/DREQ1" to be inputted from the interface unit 9 to the control unit 12 is delayed and in the second embodiment, the input timing of the interruption signal "/INT1" to be inputted from the interface unit 9 to the control unit 12 is delayed to extend the time interval for the data transmission from the interface unit 9 to the control unit 12 of the facsimile machine main body. Thus mere addition of the DREQ signal relay circuit 906 or the interrupt signal delay circuit 907 to a control IC (integrated circuit) having the control circuit accorded with the IEEE-1284 standard makes possible to produce the facsimile machine capable of executing the parallel process.

Furthermore, in the third embodiment, the acceptance time interval for the interruption signal "/INT1" which is to be inputted from the interface unit 9 to the control unit 12 of the facsimile machine main body is, by way of software manipulation, regulated to be more than the predetermined time period Δt3 to delay the input timing of the interruption signal "/INT1" from the interface unit 9 to the control unit 12 of the facsimile machine main body. Accordingly, the facsimile machine capable of executing the parallel process is made at low cost with further simplicity compared to the cases of first and second embodiments.

Figure 11:
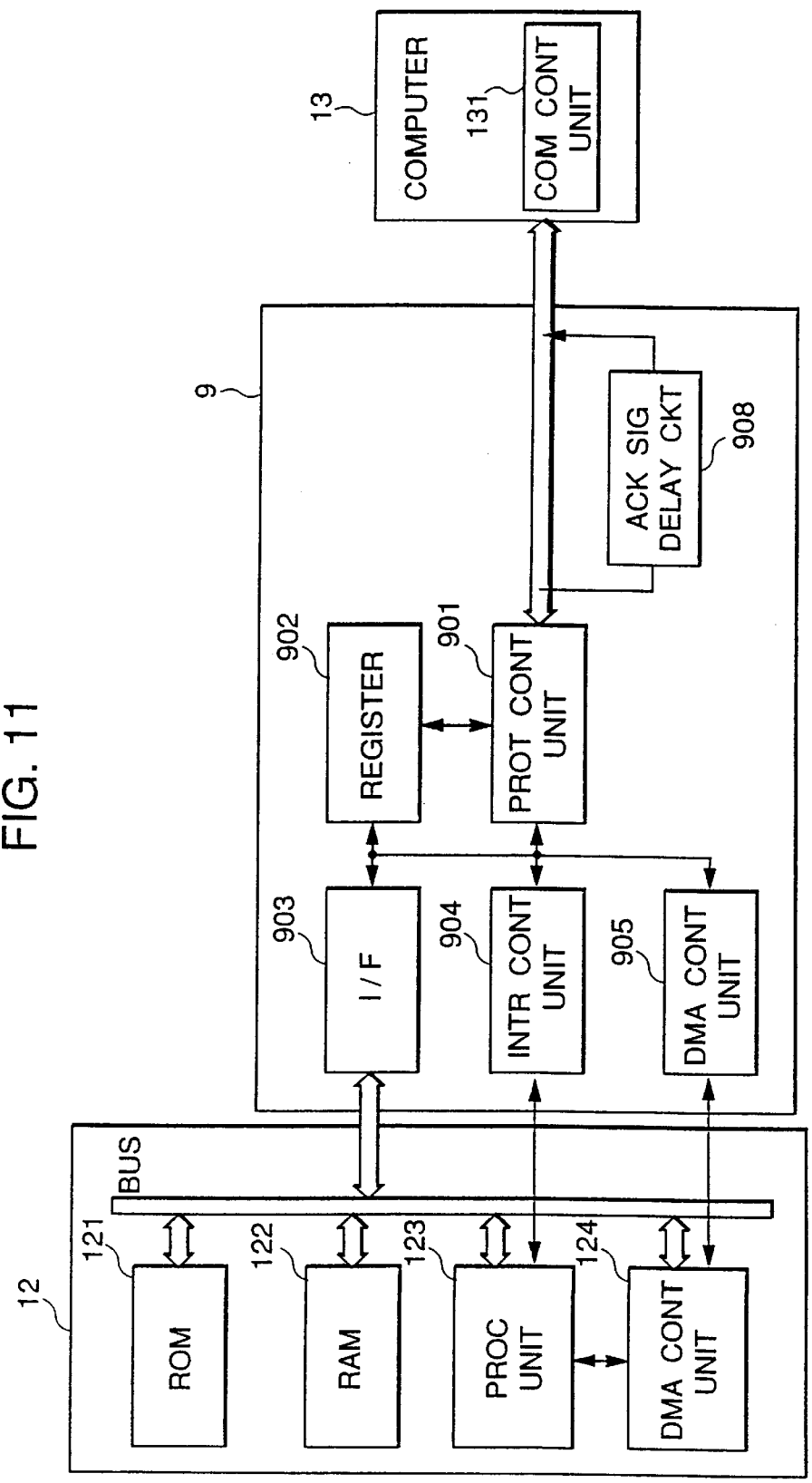
FIG. 11 is a block diagram showing an interface section of a fourth embodiment of this invention.

FIG. 11 is a block diagram showing in particular the interface unit 9 of a fourth embodiment of this invention.

We had in the first through the third embodiments in which the data transmission time interval between the interface unit 9 and the control unit 12 is extended, in turn, slowing down the communication speed between the facsimile machine 1 and the computer 13 to execute the parallel process operations, namely the facsimile machine oriented operation and the communication operation.

The fourth embodiment shown in FIG. 11 is equivalent to the block diagram such as eliminating the DREQ signal delay circuit 906 from the circuit diagram shown in FIG. 2 or eliminating the interruption signal delay circuit 907 from the circuit diagram shown in FIG. 6 and adding an ACK signal delay circuit 908 (corresponding to a control circuit 91) between the protocol control unit 901 and the computer 13.

According to the IEEE-1284 standard, the recipient, upon receipt of the transmitted data, shall return a response signal (i.e., ACK signal) indicating the safe receipt of the data to the sender. The sender, upon receipt of the ACK signal, transmits the next data to the recipient. The ACK signal delay circuit 908 delays the input timing of the ACK signal sent from the facsimile machine 1 to the computer 13.

Figure 12:
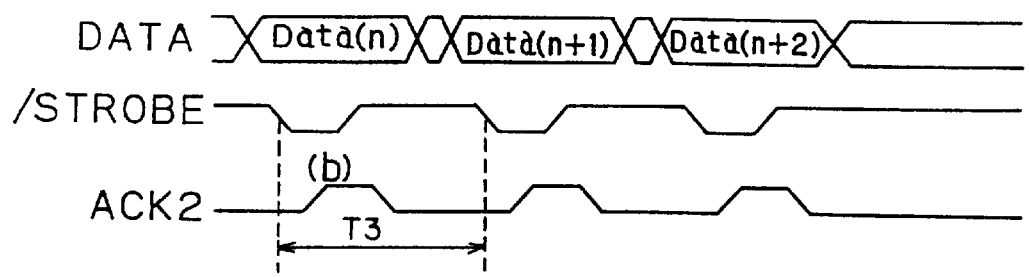
FIG. 12 is a diagram showing one example of response wave of each signal between the interface section and a control section of the fourth embodiment when the communication speed with the externally provided computer is of standard level.
Figure 13:
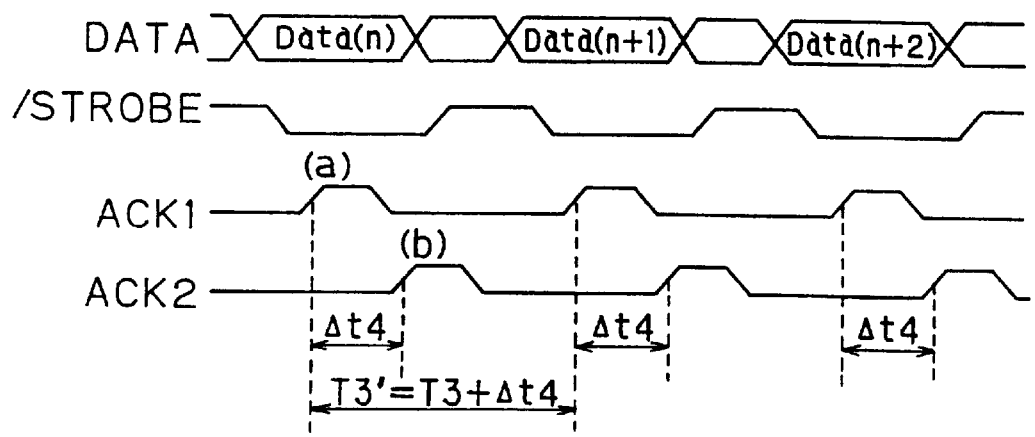
FIG. 13 is a diagram showing one example of response wave of each signal between the interface section and a control section of the fourth embodiment when the communication speed with the externally provided computer is regulated.

FIG. 12 shows one example of response wave for each signal exchanged between the interface unit 9 of the fourth embodiment and the computer 13 when the communication speed with the computer 13 is at its normal speed. While FIG. 13 shows one example of response wave for each signal exchanged between the interface unit 9 of the fourth embodiment and the computer 13 when the communication speed with the computer 13 is regulated.

In both Figs, a signal "DATA" represents data sent from the computer and a signal "/STROBE" is a synchronizing pulse for data transmission. A signal "ACK1" is an ACK signal outputted from the protocol control unit 901 of the interface unit 9 and a signal "ACK2" is an ACK signal inputted from the ACK signal delay circuit to the computer 13. Further, the signal "/STROBE" is a low active signal and the signals "ACK1" & "ACK2" are high active signals.

In FIG. 12, the delayed time duration Δt is set to "0", thus the signal "ACK1" is identical with the signal "ACK2". Accordingly, the illustration of the "ACK1" signal in FIG. 12 is omitted. In FIG. 13, the timing for the signal "ACK2" becomes active (see the timing (b)) is delayed from the timing for the signal "ACK1" to become active (see the timing (a)) by Δt4 due to the fact that the ACK signal delay circuit 908 is interposed.

The synchronizing pulse of the signal "/STROBE" with respect to each data is terminated upon receipt of the ACK signal, thus when a certain time period is set for the delayed time duration Δt4, the pulse width of each synchronizing pulse is extended by the delayed time duration Δt4. As a result, the time interval for each synchronized pulse (i.e., time interval for transmission of each data) T3 is extended to T3' which is equal to the summation of the original time interval T3 and the delayed time duration Δt4. Accordingly, the processing unit 123 executes the facsimile machine oriented operation in the delayed time duration Δt4 in the time sharing manner, enabling the parallel processing of two kinds of operations, the facsimile machine oriented operation and the communication operation.

The delayed time duration Δt4 in the fourth embodiment can be adjusted in accordance with the contents of the facsimile machine oriented operations.

In the fourth embodiment, the response signal "ACK" for confirming the safe receipt of the transmitted data from the computer 13 to the interface unit 9 returns to the computer 13 with the time delay to thereby extend the data communication time interval with the computer 13. Accordingly, as in the cases of the first through the third embodiments, in the fourth embodiment the facsimile machine enabling execution of parallel process can be provided without violation of the standardized communication protocol yet with simplicity and ease.

In the aforementioned embodiments, only one of the DREQ signal delay circuit 906, the interruption signal delay circuit 907, and the ACK signal delay circuit 908 is provided in the interface unit 9; however, this invention is not limited thereto. Yet, it is possible to provide all the three circuits 906, 907, 908 in the interface unit 9.

Further, the facsimile machine 1 employing the method of regulating the interruption accept time interval carries out the parallel process operation in the manner of software manipulation, thus such facsimile machine, comparing to the facsimile machine enabling the parallel process with hardware manipulation, can be provided with simplicity at a lower cost.

Moreover, in the aforementioned fourth embodiment, the input timing of ACK signal to the computer 13 is delayed with provision of the ACK signal delay circuit 908 to extend the time interval for the data transmission from the computer 13 to the interface unit 9 in the manner of hardware manipulation. However, it may also be possible to achieve the same result with software manipulation in such a manner as to make adjustment in operation control of each communication port at the communication control unit 131 of the computer 13.

Figure 14:
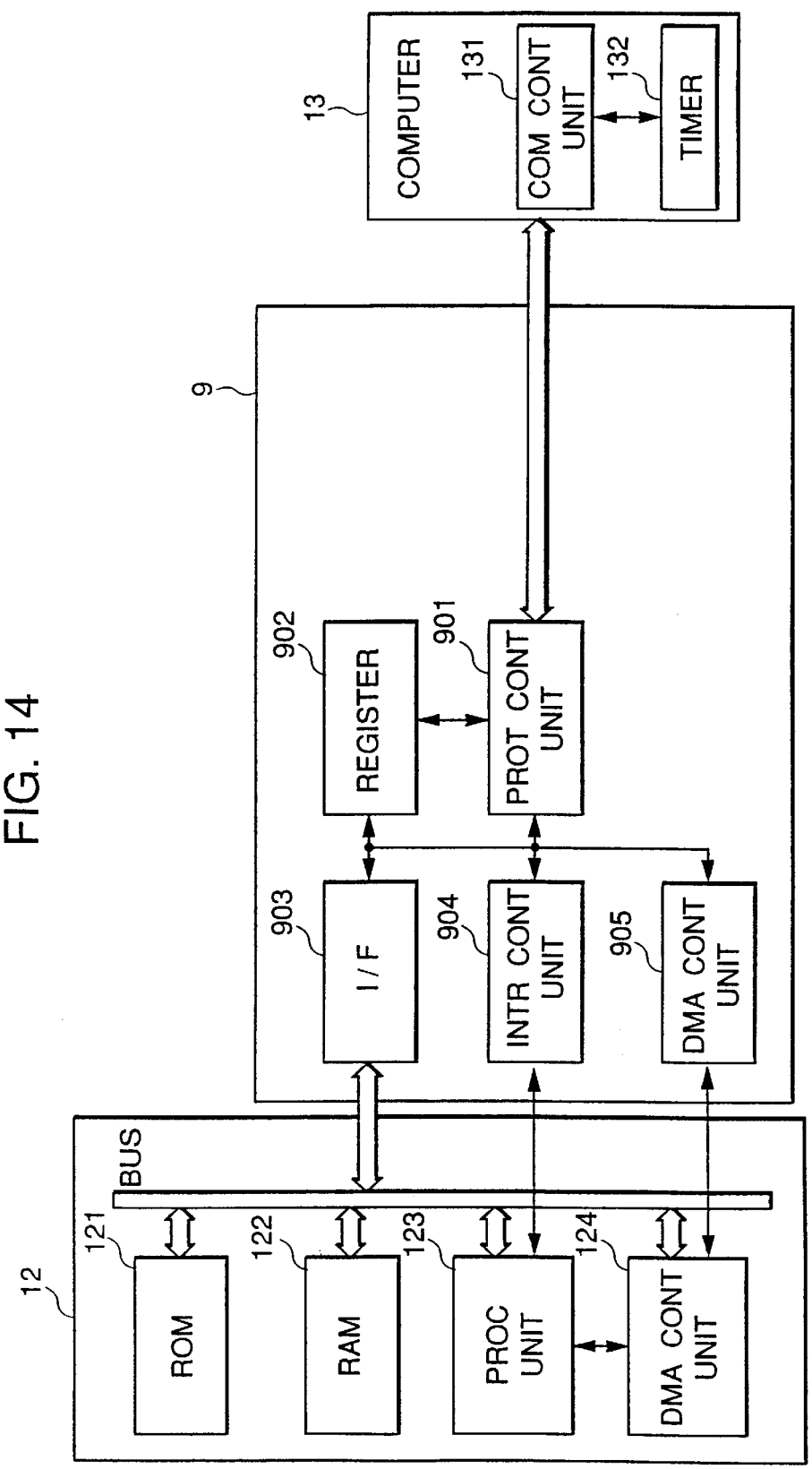
FIG. 14 is a block diagram showing one example of a communication system between a computer and a facsimile machine of a fifth embodiment.

FIG. 14 is one example of a block diagram showing the communication system between the facsimile machine 1 and the computer 13 in accordance with a fifth embodiment of this invention in which the data transmission time interval is extended in the software manipulation at the communication control unit 131.

The block diagram shown in FIG. 14 is equivalent to a diagram such as eliminating the DREQ signal delay circuit 906, the interrupt request signal delay circuit 907, and the ACK signal delay circuit 908 from the diagrams shown in FIGS. 2, 6, and 11 respectively and adding a timer 132 for counting the extended time duration in the transmission time interval of the computer 13.

Figure 15:
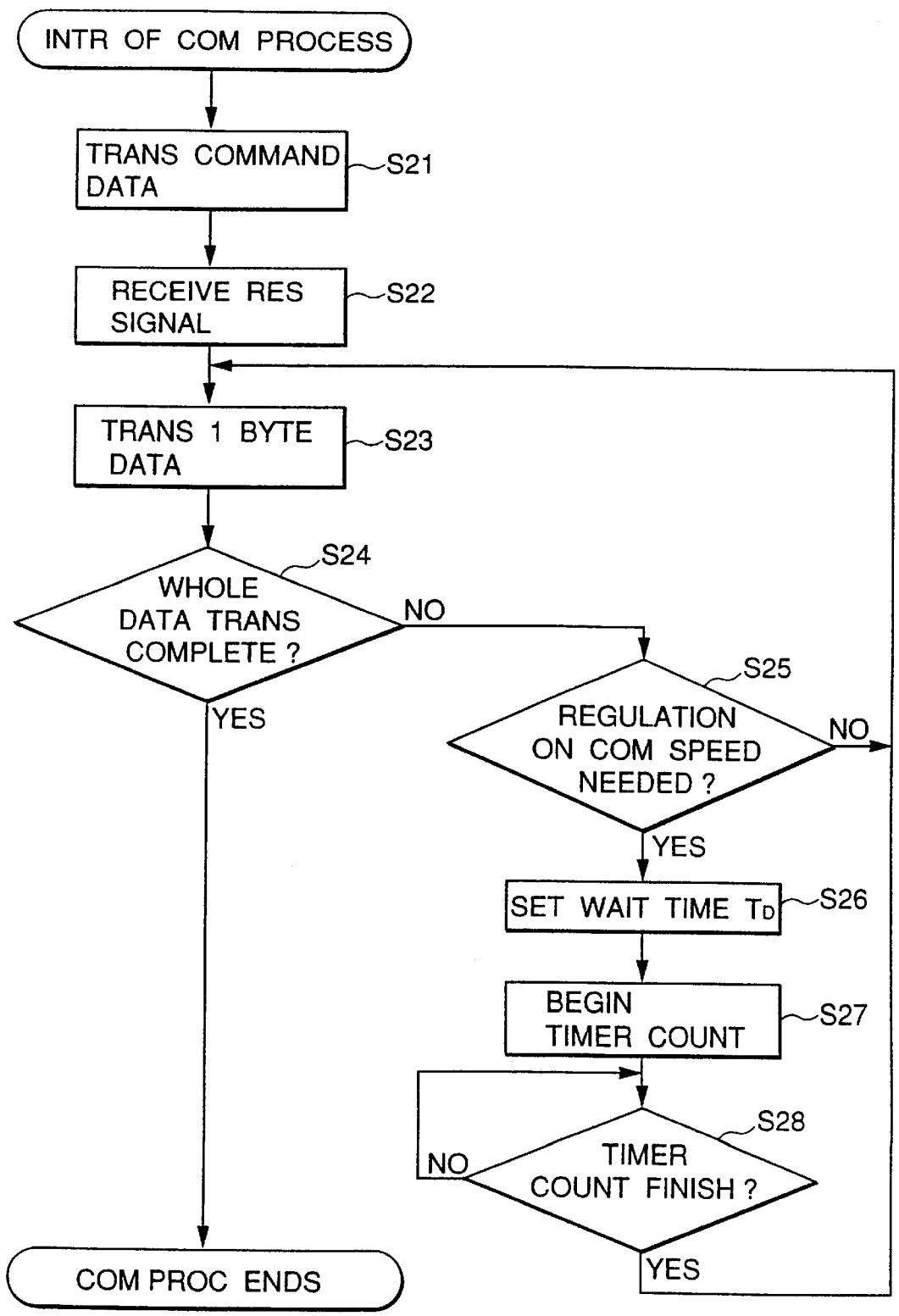
FIG. 15 is a flowchart illustrating one example of an extension control operation of the data transmission interval by the communication control section of the externally provided computer.

FIG. 15 is a diagram showing one example of flowchart for controlling the extension of the data transmission time interval with the computer 13 due to the communication control unit 131. The communication control unit 131 controls the data transmission in accordance with the flowchart of FIG. 15.

Specifically, when the interruption operation is attempted from the computer 13 with respect to a certain communication process in the control unit 12, first of all, a certain command corresponding to the communication operation is sent from the communication unit 131 to the protocol control unit 901 of the interface unit 9 (at step S21). Subsequently, the ACK signal in response to the command data from the protocol control unit 901 is returned (at step S22), then the data transmission in associate with the command begins (at step S23).

The data is subsequently transmitted in the unit of one byte (loop in step S23 through step S28). However, if the necessity of regulating in the communication speed based on the response signal from the interface unit 9 with respect to the first data is judged (at step S25). When it is judged that the regulation of the communication speed is necessary ("Yes" in step S25), a predetermined wait time period TD is set (at step S26). Subsequently, the time count of the predetermined wait time with the timer 132 begins (at step S27). When the wait time period TD elapses ("Yes" in step S28), the routine returns to the step S23, incoming one byte data is transmitted. On the other hand, if it is determined at the step S25 that the regulation of the communication speed with the computer is not necessary ("No" in step S25), then skipping the counting of the wait time period TD, the routine goes back to the step S23 for carrying out the transmission of incoming one byte data.

Subsequently, at each data transmission, it is judged necessity of regulation of the communication speed based on the response signal with respect to the data, and if it is determined that the regulation of the data communication speed is necessary, then the certain wait time period TD is counted, thereafter the incoming data is sent to the interface unit 9. If, however, it is determined that the regulation of the data communication speed is not necessary, then without counting the wait time period TD the incoming data is sent to the interface unit 9 (loop of step S23 through step S28). When all the data transmission is complete ("Yes" in step S24), the data transmission operation ends.

As in the aforementioned description, with the method of extending the data transmission time interval from the computer 13 to the interface unit 9, facsimile machine 1 enabling the execution of parallel process can be provided with simplicity at lower cost in comparison with the facsimile machine employing the method of hardware manipulation.

In the aforementioned embodiment, when the interruption is made from the computer 13 to the facsimile machine 1 which is in process of facsimile machine oriented operation, the facsimile machine 1 is automatically set to the state enabling the execution of the parallel process. However, the facsimile machine 1 may be set such that the facsimile machine 1 executes the parallel process upon receipt of the command from the computer 13.

In case that the mode set for executing the parallel process (hereinafter referred to as a parallel process mode) of the facsimile machine 1 is made possible from the computer 13, the parallel process mode of the facsimile machine 1 is terminated by the computer 13 to stop the facsimile machine oriented operation of the facsimile machine 1 to thereby make the facsimile machine 1 to be ready for the execution of the interrupt process operation. Thus this is suitable especially when the communication process is urged.

The mode selection of the parallel process mode is carried out in the manner of software manipulation such as providing the command for selecting the parallel process mode in the AT command type or an original command type.

Figure 16:
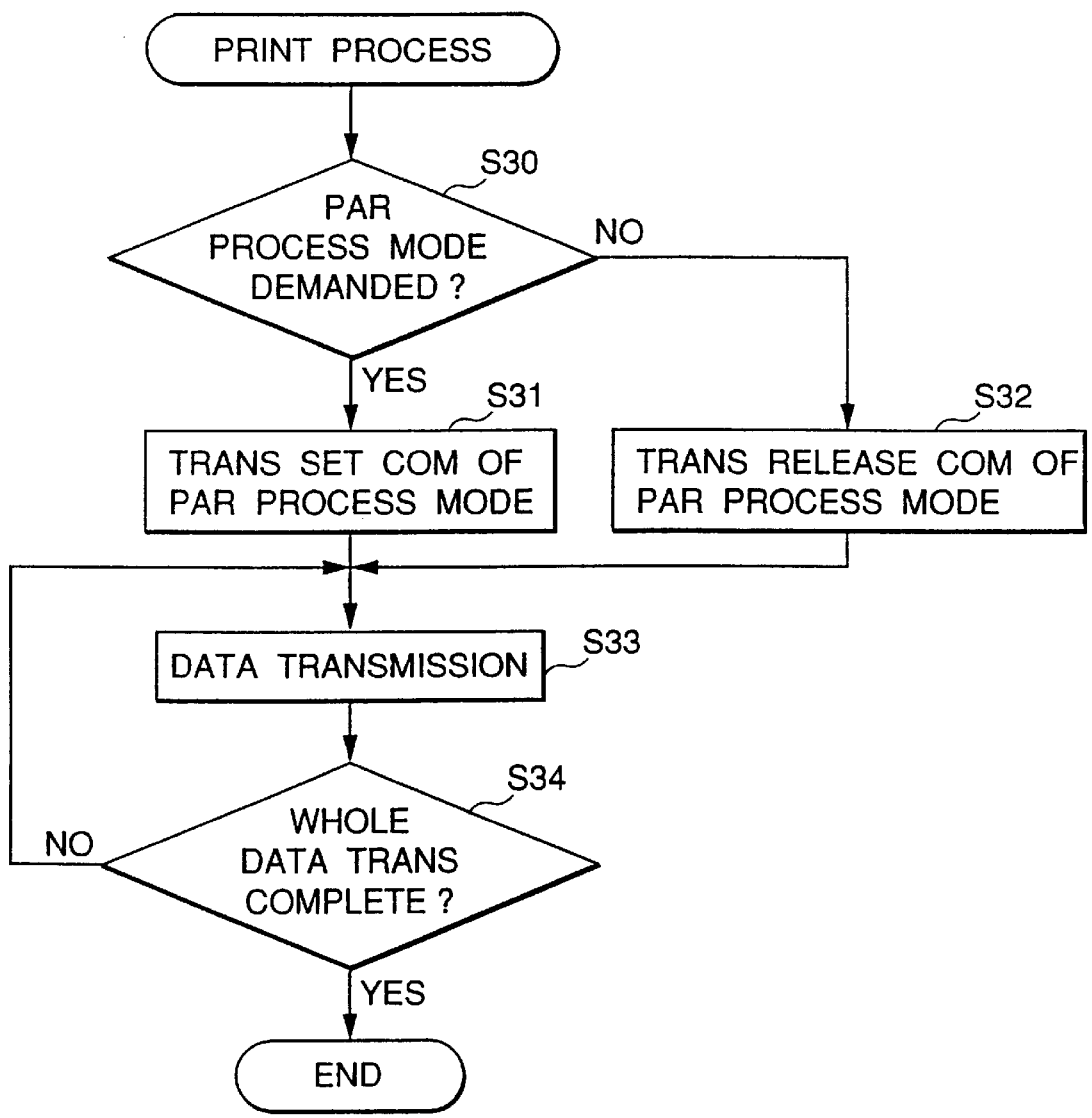
FIG. 16 is a flowchart illustrating communication operation conducted on the computer side when a parallel process mode is set selectable upon command of the computer.
Figure 17:
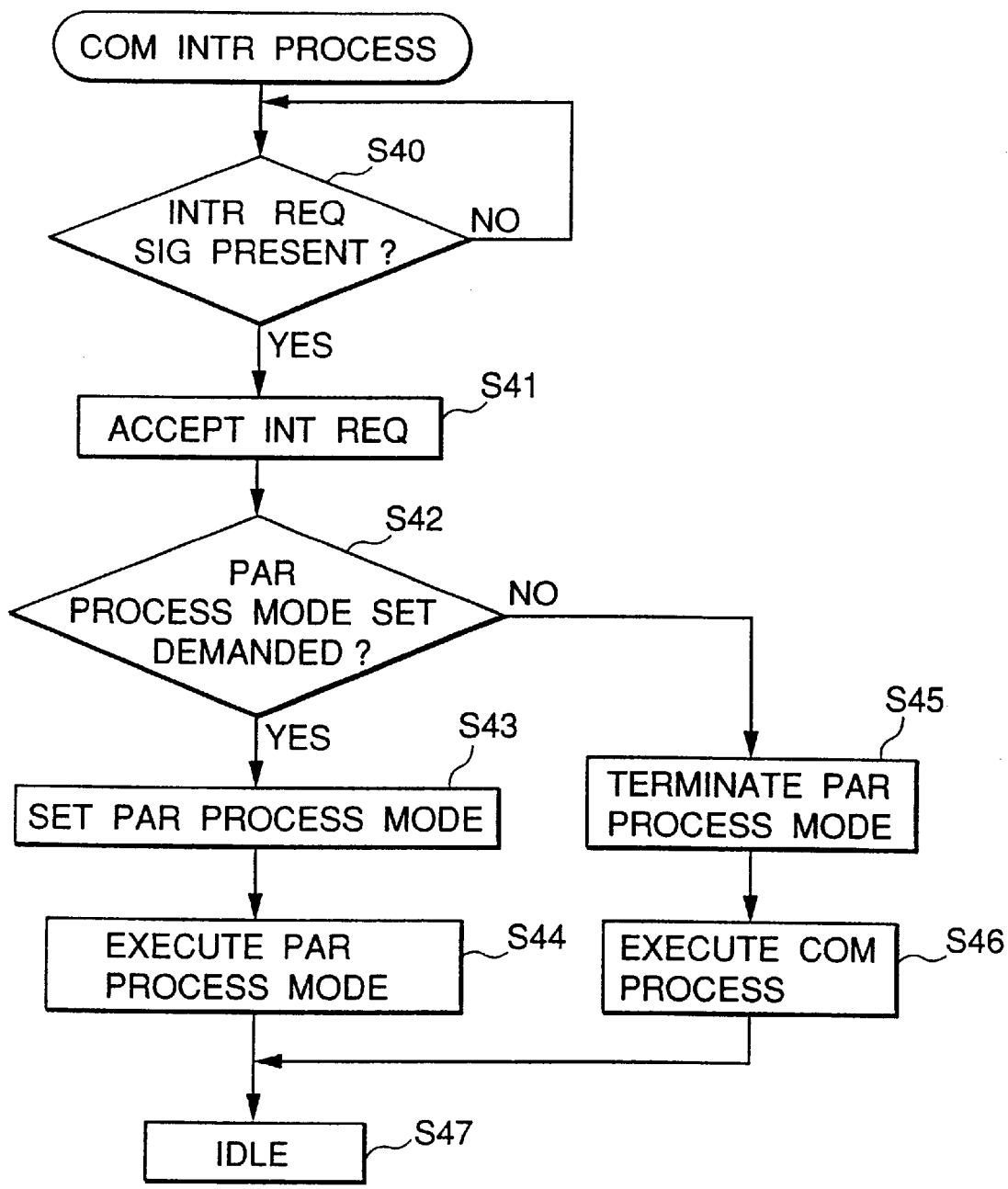
FIG. 17 is a flowchart illustrating communication operation conducted on the facsimile machine side when a parallel process mode is set to be selectable upon receipt of the command from the computer.

FIG. 16 is a flowchart showing one example of communication process when the parallel process mode is selectable by the command from the computer 13. FIG. 17 is a flowchart showing communication process when the image data made by the computer 13 is printed out with the facsimile machine 1. The flowchart of FIG. 16 shows the tasks carried out on the computer 13 side. The flowchart of FIG. 17 shows the tasks carried out on the facsimile machine 1 side.

On the computer 13 side, when an operator gives an instruction of print out operation as the communication process to the facsimile machine 1, first of all, it is judged if the parallel process mode is instructed or not (at step S30). If the operator has instructed the parallel process mode ("Yes" in step S30), the command signal for setting the parallel process mode is sent to the facsimile machine 1 (at step S31). If, however, the operator has not instructed the parallel process mode ("No" in step S30), the command for terminating the parallel process mode is sent to the facsimile machine 1 (at step S32).

Then when the parallel process mode is set for the facsimile machine 1 based on the command from the computer 13, the image data and the print command data for the image data are sequentially sent from the computer 13 (loop at steps S33 & S34). Thereafter, when the transmission of all the data is complete ("Yes" in step S34), the print out operation ends.

On the other hand, when the interruption of the command regarding the parallel process mode from the computer 13 occurs ("Yes" in step S40), this command is accepted (at step S41), thereafter, it is judged if the command is the setting of parallel process mode (at step S42).

If the command is the setting of parallel process mode ("Yes" in step S42), the parallel process mode is set (at step S43). Thereafter, the parallel process, the print out (as the communication operation) of the image data transmitted from the computer 13 and currently executing facsimile machine oriented operation (at step S44). If, however, the command is the termination of the parallel process mode ("No" in step S42), the parallel process mode is terminated (at step S45), the currently proceeding facsimile machine oriented operation is interrupted to execute the print out operation (as the communication operation) of the image data sent from the computer 13 at step S46), ending the interrupting operation (at step S47). In case that the print out operation is executed as the interruption operation with higher priority, the facsimile machine oriented operation is resumed after completion of the print out operation (as the communication operation).

Note that if the setting of the parallel process mode is only done with the computer 13, the parallel process function of the facsimile machine 1 will substantially become the computer's application thereby losing the priority of facsimile machine 1. Accordingly, it is preferable that the facsimile machine 1 is provided with a selection function for accepting the setting of the parallel process mode upon receipt of the command from the computer 13 and with another function for setting the parallel process mode to leave the freedom of choice in priority order to the facsimile machine 1.

Accordingly, when the facsimile machine oriented operation and communication operation come to be in conflict with each other, the parallel process mode is selectively set depending upon the degree of urgency demanded on the respective operation thereby operability in setting & terminating the parallel process mode is improved and it is made possible to best utilize the function of parallel process.

It may be possible to include menus for acceptance/refuse of the command regarding the parallel process mode and the setting/terminating of the parallel process mode in the mode setting menu to enable the operation unit 10 to manually set the parallel process mode. With said configuration, the facsimile machine main body is provided with a parallel process mode setting function (i.e., in a form of separately provided set switch or in the form of setting function in the setting menu) to enable the main body to set the parallel process mode with higher priority over the command from the computer 13.

In the former case, two kinds of operations are necessary; however, it is advantageous because the facsimile machine main body can set the parallel process mode independently from the computer 13. On the other hand, in the latter case, the computer 13 can set the parallel process mode only when the facsimile machine 1 is not in the parallel process mode, thereby simplifying the operation.

Figure 18:
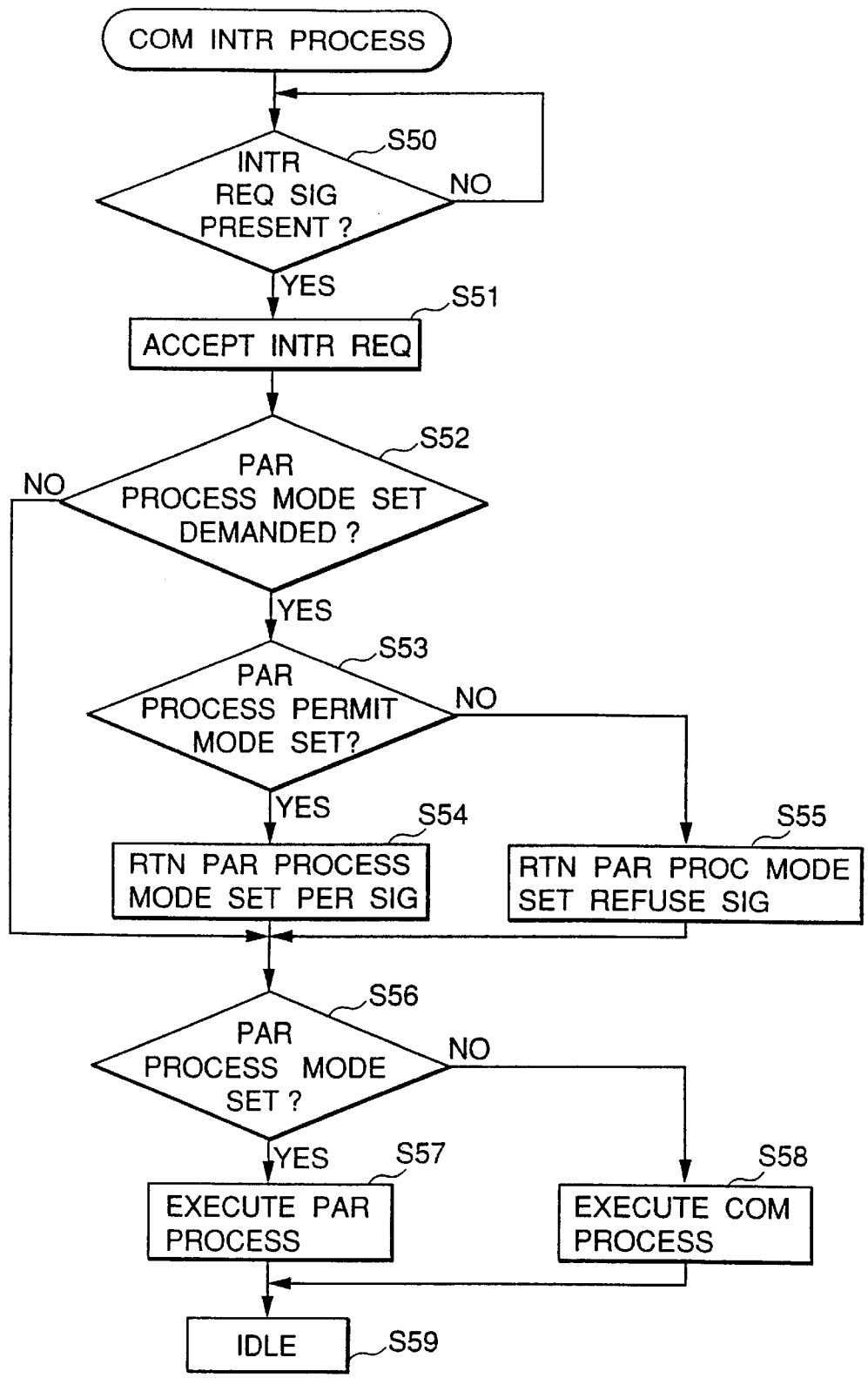
FIG. 18 is a flowchart illustrating communication operation conducted on the facsimile machine side when the command from the computer regarding the parallel process mode is set to be refusable.

FIG. 18 is a flowchart showing one example of communication operation carried out on the facsimile machine 1 side when the facsimile machine 1 is set to either accept or refuse the command regarding the parallel process mode from the computer 13.

When the interruption command regarding the parallel process mode from the computer 13 occurs ("Yes" in step S50), this command is accepted (at step S51). Subsequently, if the command is the setting command of the parallel process mode is judged (at step S52).

If the command from the computer 13 is the setting command of parallel process mode ("Yes" in step S52), then it is further judged if the mode for accepting the command regarding the parallel process mode is set (at step S53). If the answer at step S53 is affirmative, i.e., acceptance mode is set ("Yes" in step S53), the response signal allowing the setting of the parallel process mode is sent to the computer 13 and the parallel process mode is set based on the command (at step S54). At the step S53, it is judged that the refusing mode is set ("No" in step S53), the response signal refusing the setting of the parallel process mode is sent to the computer 13, thereby maintaining the setting condition of the facsimile machine main body as the parallel process mode (at step S55).

Furthermore, at the step S52, the command is not the setting of the parallel process mode ("No" in step S52); the routines of steps 53 through 55 are skipped.

Subsequently, if the parallel process mode is set or not is judged (at step S56). If the parallel process mode is set ("Yes" in step S56), and then the parallel process, communication operation to the data sent from the computer 13 and the facsimile machine oriented operation currently being in process, is executed (at step S57). If, however, the parallel process mode is not set ("No" in step S56), then the currently proceeding facsimile machine oriented operation is terminated to execute the communication operation to the data sent from the computer 13 (at step S58). Thereafter, the interruption process ends (at step S59). If the interruption process was carried out with higher priority over the facsimile machine oriented operation, the interrupted facsimile machine oriented operation resumes after completion of the communication process.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being therein.

What is claimed is:

1. A facsimile machine adapted for connection with an external computer and being capable of conducting a particular communication operation upon receiving a command data in a certain command type from the externally connected computer in handshaking manner, the facsimile machine comprising:

communication interval extension means for extending a data communication time interval with the externally connected computer by predetermined time duration;

operation control means for carrying out the communication operation in the extended communication time interval and a facsimile machine oriented operation in a vacant time residing in the data communication time interval in such manner that the facsimile machine oriented operation is divided into plural segments in time defined by the vacant time within each of recurring extended communication time intervals when the facsimile machine oriented operation and the communication operation are commanded to perform a contemporaneous parallel processing of the communication operation and the facsimile oriented operation.

2. The facsimile machine according to claim 1, further comprising an interface for temporary receiving data sent from the externally connected computer and for transmitting the data received to the facsimile machine main body and the communication interval extension means extends time interval for the data transmission from the interface to the facsimile machine main body.

3. The facsimile machine according to claim 2, wherein the communication interval extension means is disposed in the interface and includes delay means for delaying an input timing of a data transmission requesting signal to be sent to the facsimile machine main body from the interface to perform a DMA (direct memory access) data transmission for data from the externally connected computer to the facsimile machine main body.

4. The facsimile machine according to claim 2, wherein the communication interval extension means is disposed in the interface and includes delay means for delaying an input timing of an interrupt signal to be sent to the facsimile machine main body from the interface to transmit a command data from the externally connected computer to the facsimile machine main body.

5. The facsimile machine according to claim 2, wherein the communication interval extension means is disposed in the facsimile machine main body and includes receiving interval regulating means for regulating a time interval for receiving an interrupt signal sent to the facsimile machine main body from the interface to a predetermined time duration or more to transmit a command data sent from the externally connected computer to the facsimile machine main body.

6. The facsimile machine according to claim 2, wherein the interface transmits a receipt acknowledgment signal indicating the safe receipt of the data, when receiving data from the externally connected computer, to the externally connected computer and the communication interval extension means is disposed in the interface and includes delay means for delaying an input timing of the receipt acknowledgment signal to the externally connected computer.

7. The facsimile machine according to claim 1, wherein the operation control means, when the facsimile machine oriented operation is interrupted by a communication operation, carries out the parallel processing of the facsimile machine oriented operation having been interrupted and the interrupting communication operation at different times over the same time period.

8. The facsimile machine according to claim 1, further comprising: judging means for judging contents of the facsimile machine oriented operations, and altering means for altering the extended time duration for the data communication interval in accordance with the judgement result of the judging means.

9. The facsimile machine according to claim 1, further comprising: mode setting means for setting to a parallel process mode for conducting the parallel processing of the facsimile machine oriented operation and the communication operation and the operation control means carries out the parallel processing when the parallel process mode is set.

10. The facsimile machine according to claim 9, wherein the mode setting means is settable from the externally connected computer.

11. The facsimile machine according to claim 1, wherein the command type is an AT command.

12. The facsimile machine according to claim 1, wherein the data communication time interval is a constant time period over a given time period.

13. The facsimile machine according to claim 1, wherein each of recurring extended communication time intervals retains a constant period over a given time period.

14. The facsimile machine according to claim 1, wherein the communication operation is a DMA (direct memory access) data transmission operation.

15. The facsimile machine as defined in claim 10, further comprising setting means for setting between the parallel process mode and non-parallel process mode, having priority over the command directed to the parallel process mode from the externally connected computer.

16. The facsimile machine as defined in claim 10, further comprising a first setting means for selecting between acceptance and rejection to the command regarding the parallel process mode from the externally connected computer and a second setting means for selecting between set of parallel process mode and release of parallel process mode when the first setting means selects the rejection of the command regarding the parallel process mode from the externally connected computer.

\* \* \* \* \*